No. 700,206. Patented May 20, 1902.
H. E. A. KINDERMANN.
AUXILIARY REVERSING GEAR FOR MACHINE TOOLS.
(Application filed Dec. 27, 1901.)
(No Model.)
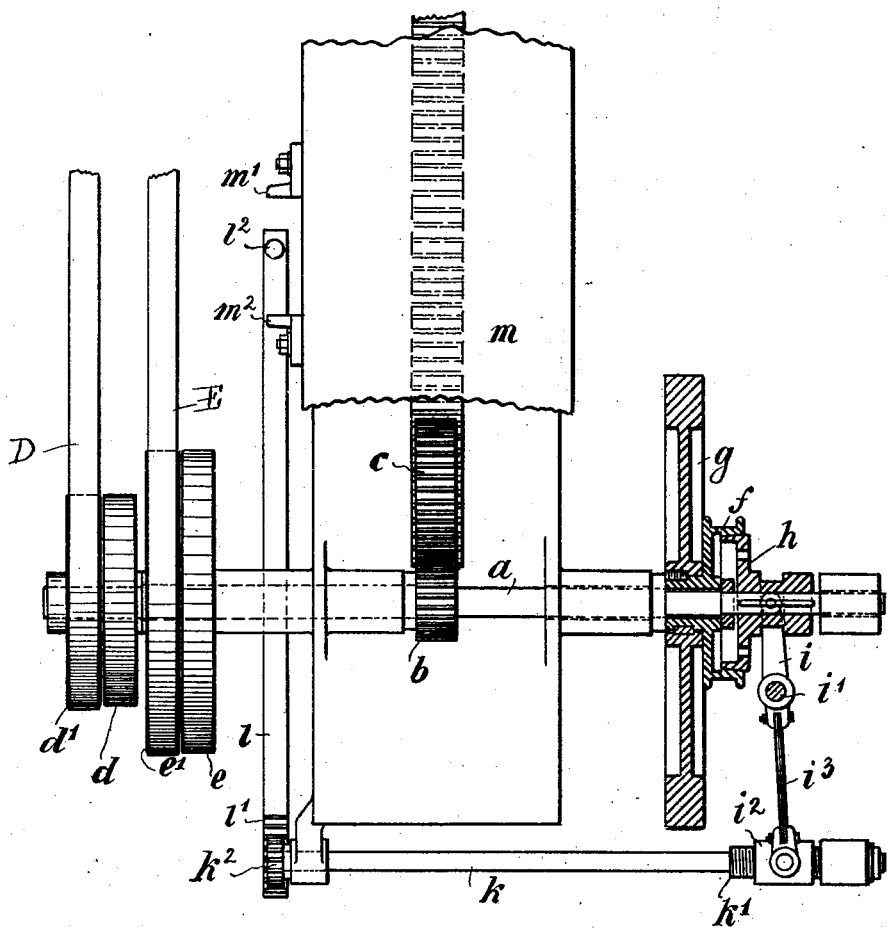
WITNESSES:
Isabella Waldron
Adelaide Claire Gleason
INVENTOR.
Heinrich Eduard August Kindermann
BY
Richards
ATTORNEYS.

United States Patent Office.

HEINRICH EDUARD AUGUST KINDERMANN, OF CHEMNITZ, GERMANY.

AUXILIARY REVERSING-GEAR FOR MACHINE-TOOLS.

SPECIFICATION forming part of Letters Patent No. 700,206, dated May 20, 1902.

Application filed December 27, 1901. Serial No. 87,483. (No model.)

*To all whom it may concern:*

Be it known that I, HEINRICH EDUARD AUGUST KINDERMANN, a subject of the King of Prussia, Emperor of Germany, and a resident of Chemnitz, in the Kingdom of Saxony, German Empire, have invented certain new and useful Improvements in Auxiliary Reversing-Gear for Machine-Tools having Reciprocating Motion, of which the following is a specification.

Heretofore, as far as I am aware, machine-tools with reciprocating motion—such as planers, shaping-machines, paring-machines, and the like—have all been objectionable, in that they required a much larger amount of power the moment that the back motion was started than is needed for the actual work, this being especially the case if the said back motion is accelerated.

The object of the present invention is to avoid this defect by providing means whereby the extra force required for initial reversing is not drawn from the working power, but is taken from a fly-wheel, which is rotated either by the driving-shaft itself with the aid of an intermediate gearing or by means of some other device in a direction contrary to that in which the driving-shaft turns during the forward motion. When the machine is reversed for back motion, said fly-wheel is connected directly with the driving-shaft of the machine, so as to deliver the stored-up power to the driving-shaft and to start the reversed motion of the various parts.

I have illustrated the invention in the accompanying drawing, which is a plan view, partly in section.

In the drawing I represent the slide or reciprocating front of a planer or similar machine for carrying the tool-holder and tool, which are not shown herein, as they constitute no part of the present invention. A reciprocating motion is imparted to this slide by means of a rack $m$ and intermeshing gears $c$ and $b$, the latter of which is carried by the driving-shaft $a$. Motion is imparted to this shaft in either direction by oppositely-running belts D and E, driven from any suitable source of power. A fast pulley $d$ and loose pulley $d'$ are provided for the belt D and similarly a fast pulley $e$ and loose pulley $e'$ for the belt E, and when one belt is shifted to its fast pulley the other is designed to be shifted to its loose pulley, and vice versa, whereby the shaft $a$ may be driven in either direction.

A fly-wheel $g$ of suitable weight is loosely journaled upon the shaft $a$ and has rigidly secured thereto a flange or pulley $f$, over which a belt (not shown) may pass, driven from any suitable source of power, but in a direction reverse to the motion of the shaft $a$ when giving a forward or working stroke to the slide $m$. This pulley $f$ is preferably made to form one member of a clutch, the other member $h$ being splined to the shaft $a$ and moved by a shifting-lever $i$, pivotally mounted upon a fixed axis $i'$. It will thus be seen that as long as the slide is being driven on its forward or working stroke the fly-wheel by having the clutch uncoupled will rotate truly upon the shaft $a$ and in a contrary direction. When, however, the motion of the slide is to be reversed and it is desired to secure additional power for the initial backward movement, it is only necessary to throw the clutch member $h$ into engagement with the clutch-face of pulley $f$, thereby coupling the fly-wheel $g$ to the shaft $a$, thus securing the momentum of the heavy fly-wheel to assist the normal power.

I prefer to clutch and unclutch the fly-wheel automatically, and the means which I deem best for this purpose is that shown in the drawing. This comprises a nut $i^2$, secured to the arm $i^3$ of the lever $i$ and engaged by the threaded portion $k'$ of a shaft $k$, journaled in suitable bearings. A bar $l$ has a rack $l'$ engaging a gear $k^2$ on the shaft $k$, and at its other end the rod carries a pin or projection $l^2$, designed to contact with stops or abutments $m'$ and $m^2$ on the slide, near each extremity of the movement of the latter. Thus when the slide is nearing either extremity of its movement the contact of the abutment $m'$ or $m^2$ with the pin $l^2$ reciprocates the rod and through the rack and gear rotates the shaft, which in its turn through screw $k'$ and nut swings the lever to clutch or unclutch the fly-wheel, as the case may be.

In order to avoid sudden shock or jar when the clutch is operated, I prefer to make the arm $i^3$ of spring or yielding material, as shown.

Having thus described my invention, what I claim is—

1. In a device of the class described, the combination with the slide and the driving-shaft operatively connected thereto with means for driving said shaft in either direction, of a fly-wheel mounted to rotate independently of said shaft, means for rotating said fly-wheel in a direction reverse to the forward motion of the shaft, and means for connecting said fly-wheel to the shaft when reversing the movement of the same.

2. The combination with the slide and driving-shaft operatively connected therewith, with means for rotating it in either direction, of a fly-wheel loosely journaled on said shaft and means for automatically coupling and uncoupling said fly-wheel to and from said shaft near the extremities of the movement of the slide.

3. The combination with the slide and driving-shaft operatively connected therewith with means for driving it in either direction, of a fly-wheel journaled on said shaft with means for driving it, clutch mechanism for connecting said fly-wheel to and disconnecting it from the shaft, a movable bar extending into proximity to the slide, stops or abutments on the slide for moving the bar as the slide approaches either extremity of its movement, and means whereby the movement of the bar operates the clutch mechanism.

4. The combination with the slide and driving-shaft operatively connected thereto with means for driving it in either direction, of a fly-wheel loose on said shaft, means for driving the same, a clutch for connecting said wheel to and disconnecting it from the shaft, a movable bar extending into proximity to the slide, abutments on the slide for engaging the bar as the slide approaches either extremity of its stroke, and yielding connections between said bar and clutch whereby the movement of the bar operates the clutch without shock.

In witness whereof I have hereunto set my hand in presence of two witnesses.

HEINRICH EDUARD AUGUST KINDERMANN.

Witnesses:
　EDGAR RICHTER,
　H. MANOT.